(12) United States Patent
Uejima

(10) Patent No.: US 7,917,558 B2
(45) Date of Patent: Mar. 29, 2011

(54) EASILY GRASPABLE NUMERICAL EXPRESSION DISPLAY APPARATUS

(75) Inventor: Hiroshi Uejima, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1024 days.

(21) Appl. No.: 11/726,140

(22) Filed: Mar. 21, 2007

(65) Prior Publication Data

US 2007/0226283 A1    Sep. 27, 2007

(30) Foreign Application Priority Data

Mar. 27, 2006   (JP) .................................. 2006-085535

(51) Int. Cl.
*G06F 15/02* (2006.01)
(52) U.S. Cl. ...................................................... 708/131
(58) Field of Classification Search .................. None
See application file for complete search history.

(56) References Cited

U.S. PATENT DOCUMENTS

| | | | | |
|---|---|---|---|---|
| 5,067,102 A | | 11/1991 | Eisenstein | |
| 5,377,130 A | * | 12/1994 | Frank et al. | 708/142 |
| 5,432,721 A | * | 7/1995 | Satoh | 708/168 |
| 5,481,626 A | * | 1/1996 | Matsubayashi | 382/189 |
| 6,795,838 B1 | * | 9/2004 | Kataoka | 708/160 |
| 2007/0150863 A1 | * | 6/2007 | Katayama | 717/110 |
| 2008/0066052 A1 | * | 3/2008 | Wolfram | 717/109 |

FOREIGN PATENT DOCUMENTS

| | | |
|---|---|---|
| JP | 5-324565 A | 12/1993 |
| JP | 7-287705 A | 10/1995 |

OTHER PUBLICATIONS

Japanese Office Action dated Oct. 19, 2010 (and English translation thereof) in counterpart Japanese Application No. 2006-085535.

* cited by examiner

*Primary Examiner* — David H Malzahn
(74) *Attorney, Agent, or Firm* — Holtz, Holtz, Goodman & Chick, PC

(57) ABSTRACT

When a numerical expression (FIG. 6(*a*)) is inputted to a mathematical calculator (1) and then a rough display key (27) is depressed, calculation units composing the numerical expression are converted to display blocks, whereby the numerical expression is displayed in a natural expression form on a display (3) and a rough map (M) is also displayed in which the display blocks are disposed at positions corresponding to those of the calculation units of the numerical expression in the natural expression form (FIG. 6(*b*)). A calculation unit of the numerical expression to be edited is indicated by a cursor (30) and a corresponding display block of the rough map is displayed emphatically in the rough map (FIG. 6(*c*)).

8 Claims, 10 Drawing Sheets

FIG.6(a) $$\frac{-b+\sqrt{b^2-4ac}}{2a}$$
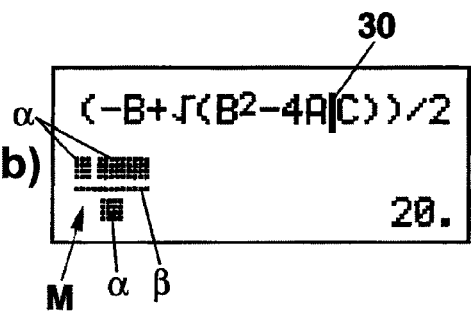
FIG.6(b)
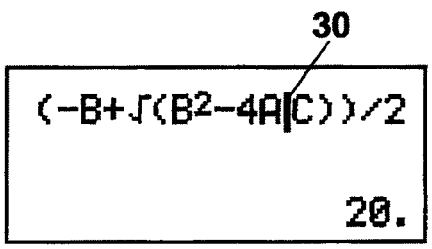
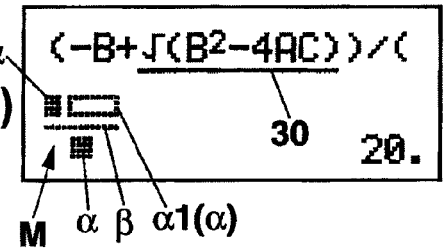
FIG.6(c)
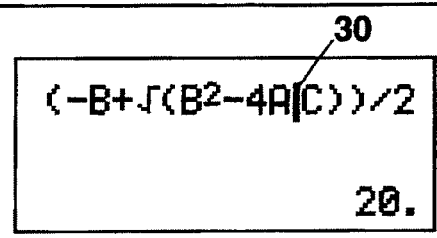

FIG.7(a)
$$\frac{\frac{-b+\sqrt{b^2-4ac}}{\int^8 x^2 dx}}{\sin(60)}$$
FIG.7(b) 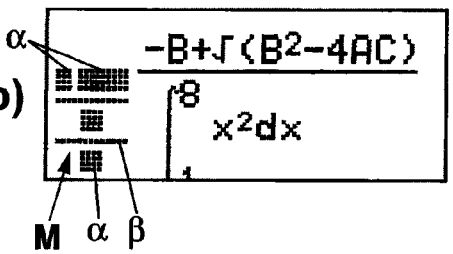 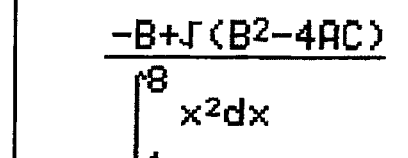

FIG.9(a)

$\alpha$ — (-B+√(B²-4AC))/(

FIG.10(a)
$$\frac{-b+\sqrt{b^2-4ac}}{2a}$$
FIG.10(b)
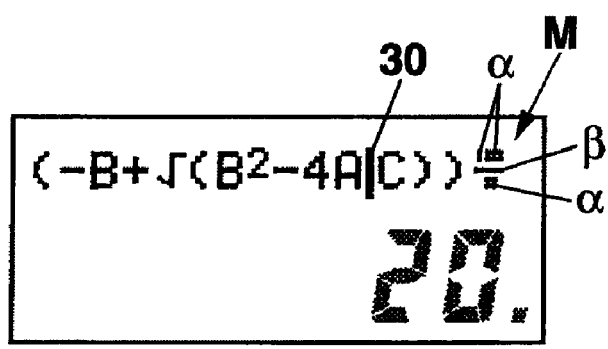
FIG.10(c)
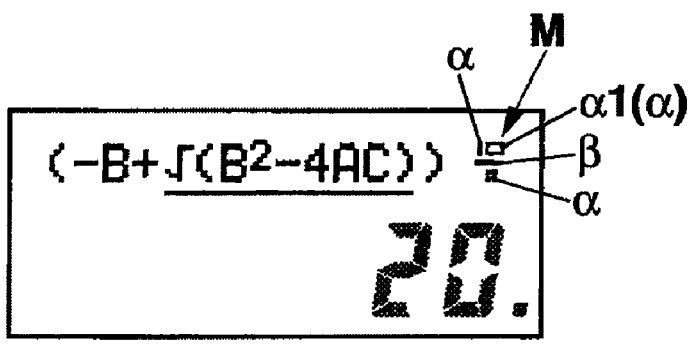

PRIOR ART

FIG.11(a)

$$\frac{\frac{-b+\sqrt{b^2-4ac}}{\int^8 x^2 dx}}{\sin(60)}$$

FIG.11(b)

$$\frac{-B+\sqrt{(B^2-4AC)}}{\int^8 x^2 dx}$$

EASILY GRASPABLE NUMERICAL EXPRESSION DISPLAY APPARATUS

BACKGROUND OF THE INVENTION

1. Field of the Invention

The present invention relates to numerical expression display control apparatus, method and program.

2. Description of the Related Art

There have been electronic calculators called a mathematical calculator that calculates the value of a respective one of various numerical expressions involving different arithmetic operations and sinusoidal and logarithmic functions inputted to the calculator, thereby displaying a result of the calculation.

These mathematical calculators selectively employs a single-line expression form used in computer calculations and a natural expression form used in general books or school-books to express a numerical expression. For example, the square of "a" is expressed as "a^2" in the single-line expression form and as "a$^2$" in the natural expression form.

When the single line expression form is employed for a numerical expression, it is difficult to grasp the whole structure of the numerical expression as its structure is complicated. When the natural expression form is used, the whole structure of the numerical expression can be grasped easier than when the single line expression form is employed. However, as the numerical expression is massive excessively as shown in FIG. 11(a), the whole numerical expression is not necessarily displayed and the whole structure of the numerical expression is difficult to grasp.

It is therefore an object of the present invention to provide a numerical expression display control apparatus that allows a user to easily grasp the whole structure of a numerical expression displayed on a display.

In order to achieve the above object, the present invention provides a numerical expression display control apparatus comprising: a display; an input unit that inputs a numerical expression to the apparatus; a dividing unit that divides the numerical expression inputted by the input unit into a plurality of calculation units; and a map display controller that converts the plurality of calculation units to a like number of smaller display blocks, and forming and displaying on the display a map in which the display blocks are disposed at positions corresponding to those of the plurality of calculation units in the numerical expression expressed in a natural expression form.

According to the present invention, the map display controller converts the plurality of calculation units to a like number of smaller display blocks, and forms and displays on the display a map in which the display blocks are disposed at positions corresponding to those of the plurality of calculation units in the numerical expression expressed in a natural expression form. Thus, unlike the conventional case where a numeric expression is expressed in the single line expression form, the structure of the numerical expression can be easily grasped in the natural expression form even when it is complicated. In addition, since the size of a display block indicative of each calculation unit is smaller than the same, the whole map is displayed even when the numerical expression is massive unlike the conventional case where the numerical expression is expressed in the natural expression form. Thus, the whole structure of the numerical expression can be easily grasped.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 6(a) illustrates a numerical expression involving the rough map display process, and FIGS. 6(b) and (c) show different display pictures involving the rough map display process;

FIGS. 7(a) and (b) show another numerical expression and another display picture involving the rough map display process;

FIGS. 9(a) and (b) illustrate a different rough map edition process to be performed by the present invention;

FIGS. 10(a), (b) and (c) illustrate a numerical expression, a display picture, and a different display picture involving the rough map display process; and FIG. 11 shows a prior art display picture.

DETAILED DESCRIPTION OF THE INVENTION

A mathematical calculator involving a numerical expression display control apparatus according to the present invention will be described with reference to the drawings.

(1. Composition)

(1.1 External Composition)

Figure 1:
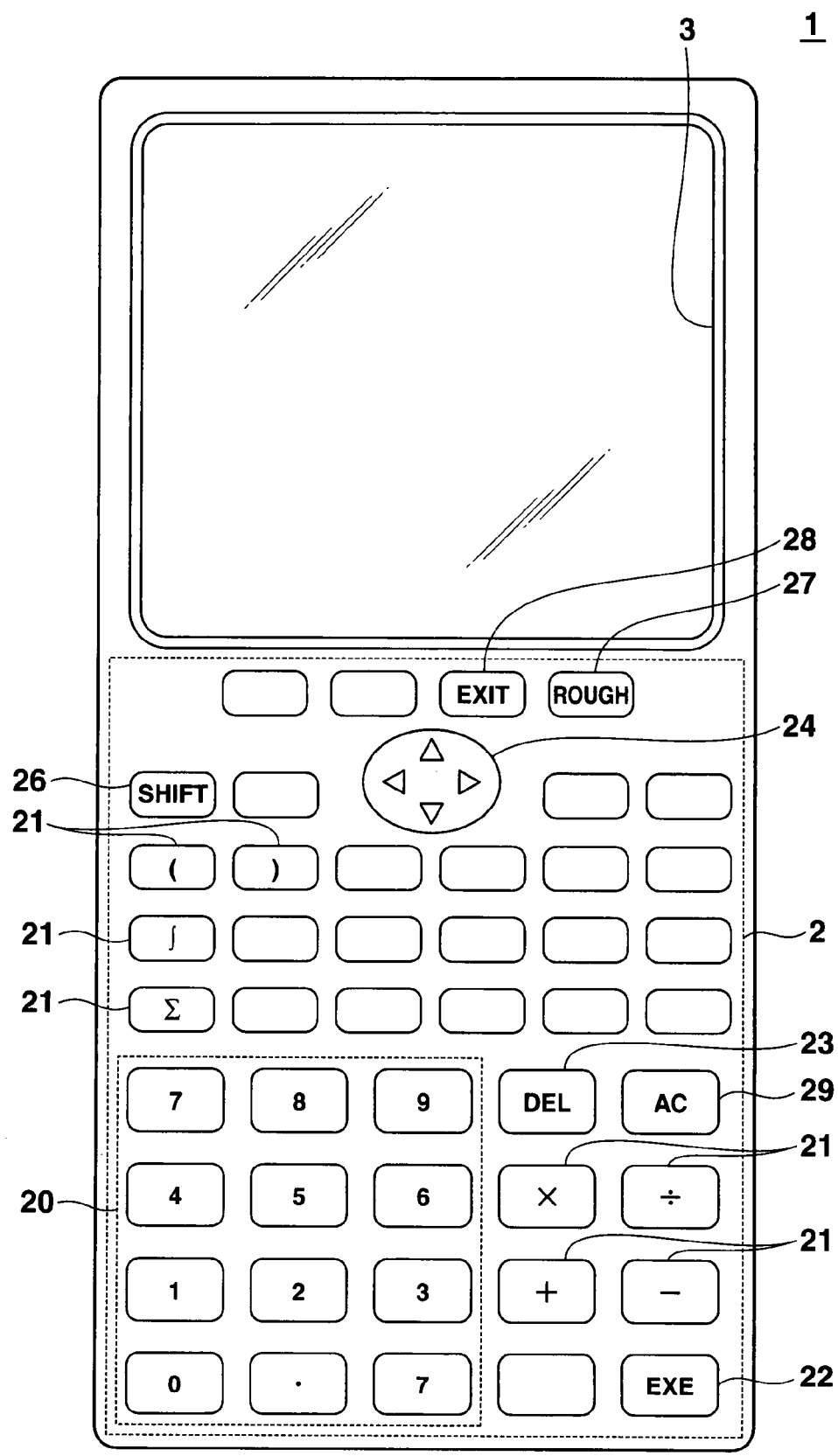
FIG. 1 schematically illustrates a mathematical calculator according to one embodiment of the present invention.

FIG. 1 is a front view of the mathematical calculator 1, which includes a key group 2 and a display screen 3. The key group 2 comprises a plurality of keys having unique functions, by which a user is able to input numerals and operators as numerical expression components to the calculator, and give commands to execute various processing steps. More specifically, the key group 2 is divided into a numeric keypad 20, an operator keypad 21, an EXE key 22, a DEL key 23, a direction keypad 24, a shift key 26, a rough display key 27, an EXIT key 28, a power source key 29 and other character keys.

The numeric keypad 20 is used to input various numerals into the calculator. The operator keypad 21 is used to input various operators to the calculator to perform arithmetic, fractional, integrating, logarithmic and adding operations. The EXE key 22 is used to give a command to execute calculation of a numerical expression inputted to the calculator.

The DEL key 23 is used to delete numerical expression components. The direction keypad 24 is used to move a cursor 30 (see FIG. 6(b)) or to select a function. The direction keypad 24 is composed of up, down, right and left direction keys.

In use, the shift key 26 is depressed together with another key. The rough display key 27 is depressed when a numerical expression edition process (see FIG. 3) is executed. The EXIT key 28 is used to give a command to terminate a respective process performed by the mathematical calculator 1. The power source key 29 is used to turn on/off a power source for the mathematical calculator 1.

The display screen 3 displays characters and symbols produced by depressing corresponding keys, numerical expressions, results of mathematical operations, and various data necessary to use the calculator 1. The display screen 3 also displays a numerical expression in a natural expression form or a single line expression form. While the display screen 3 is made of dot matrix liquid crystal, it may be another type display such as a TFT (Thin Film Transistor) liquid crystal or a PDP (Plasma Display Panel).

(1.2 Functional Composition)

Next, the functional composition of the calculator 1 will be described with respect to FIG. 2. As shown, the calculator 1 comprises an input unit 11, a display unit 12 with the display screen 3, a ROM (Read Only Memory) 6, a RAM (Random Access Memory) 7 and a CPU (Central Processing Unit) 8, which are connected by a bus 10.

(1.2.1 Input Unit and Display)

When a key of the input unit 11 is depressed, the input unit 11 delivers a corresponding signal to the CPU 8. The display screen 3 displays various information based on signals from the CPU 8.

(1.2.2 Storage)

The ROM 6 has stored various programs for displaying menus, performing various settings and various mathematical operations as well as programs to realize the various functions of the calculator 1 especially including a numerical expression edition program 60. The edition program 60 is a numerical expression display control program according to the present invention which causes the CPU 8 to perform the numerical expression edition process (see FIG. 3).

Figure 2:
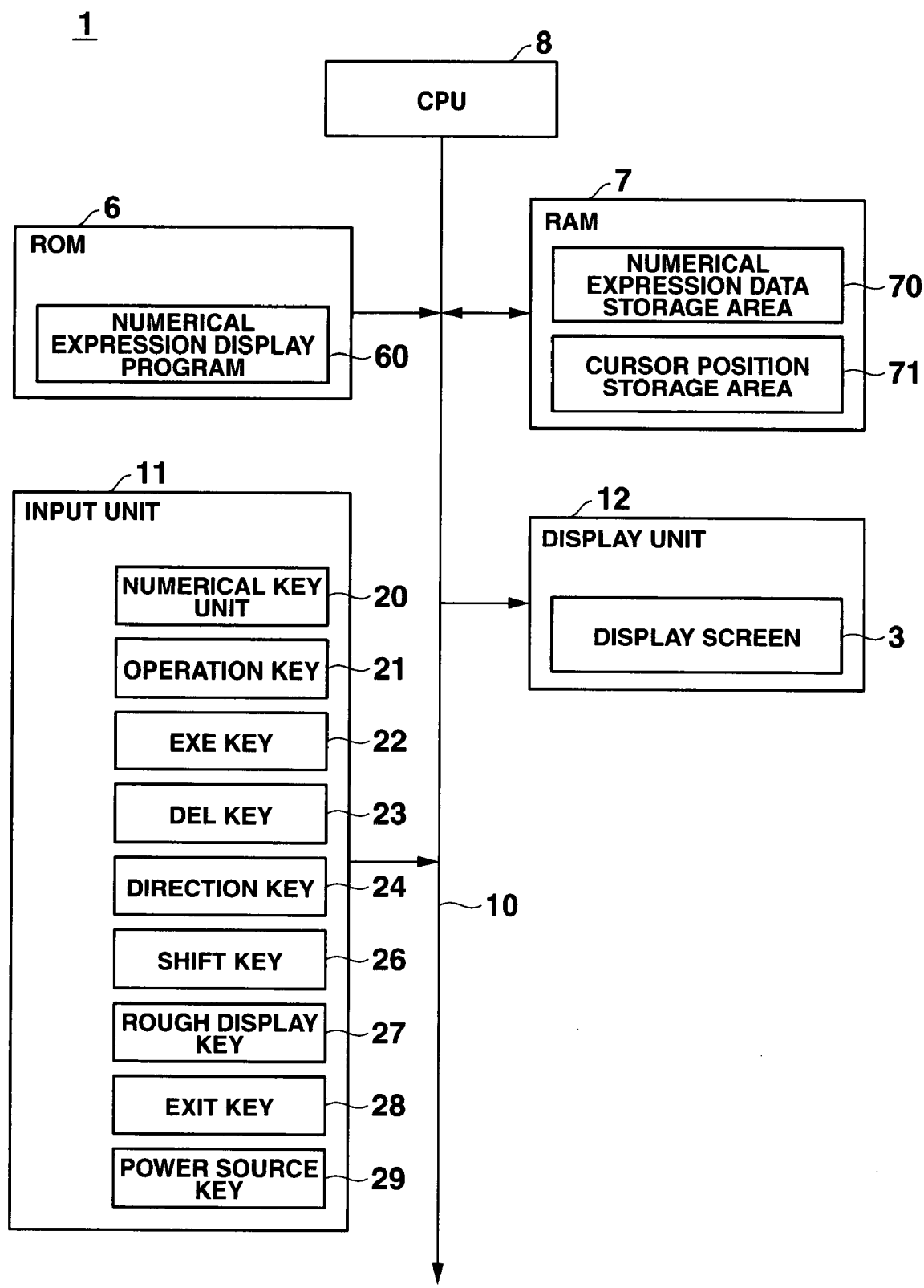
FIG. 2 is a block diagram of the mathematical calculator.

As shown in FIG. 2, the RAM 7 temporarily stores various programs to be performed by the CPU 8, data involving execution of these programs, and has a numerical expression data storage area 70 and a cursor position storage area 71. The numerical expression data storage area 70 stores data on numerical expressions displayed on the display screen 3, and more particularly numerical expression data as a character code for each character. The cursor position storage area 71 stores data on the position on the cursor 30 displayed on the display screen 3.

(1.2.3 CPU)

The CPU 8 performs processing based on a predetermined program in accordance with commands given thereto, gives commands to the respective functional sections of the calculator concerned and transfers required data to requesting functional sections. More specifically, the CPU 8 reads a program stored in the ROM 6 in accordance with an operation signal received from the input unit 4, loads the program on the RAM 7 and performs required processing in accordance with the program. The CPU 8 then forwards to the display 5 a display control signal to display a result of the processing as required and displays corresponding information on the display screen 3.

(Operation of Mathematical Calculator)

Figure 3:
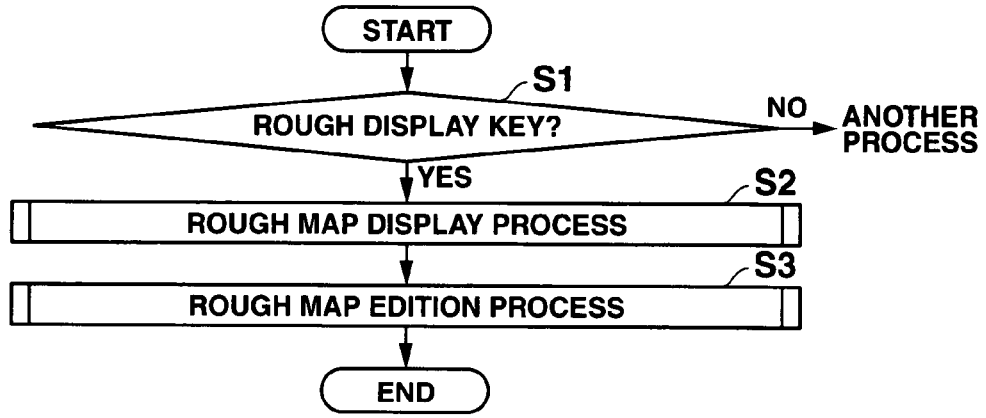
FIG. 3 is a flowchart indicative of a numerical expression edition process to be performed by the present invention.
Figure 4:
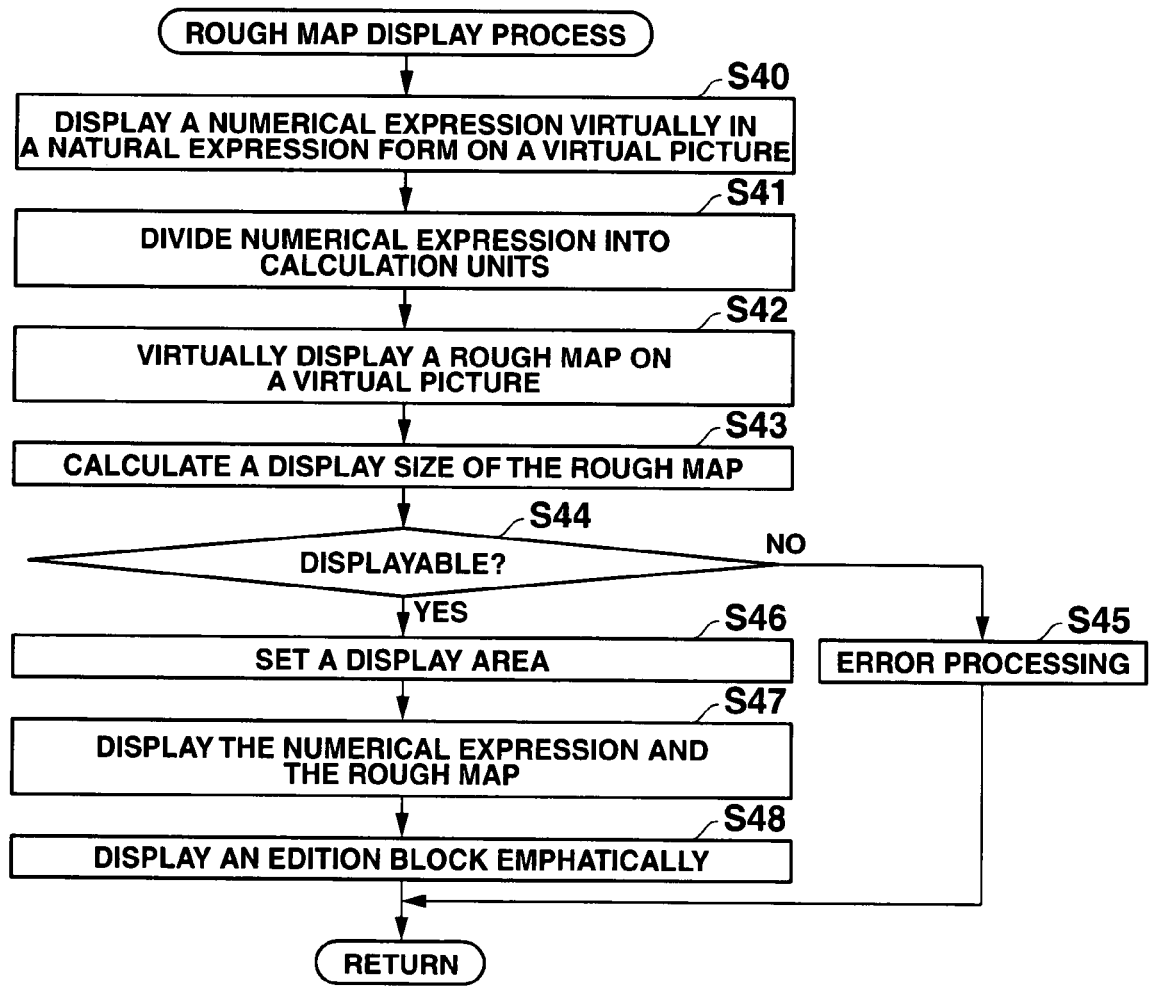
FIG. 4 is a flowchart indicative of a rough map display process to be performed by the present invention.
Figure 5:
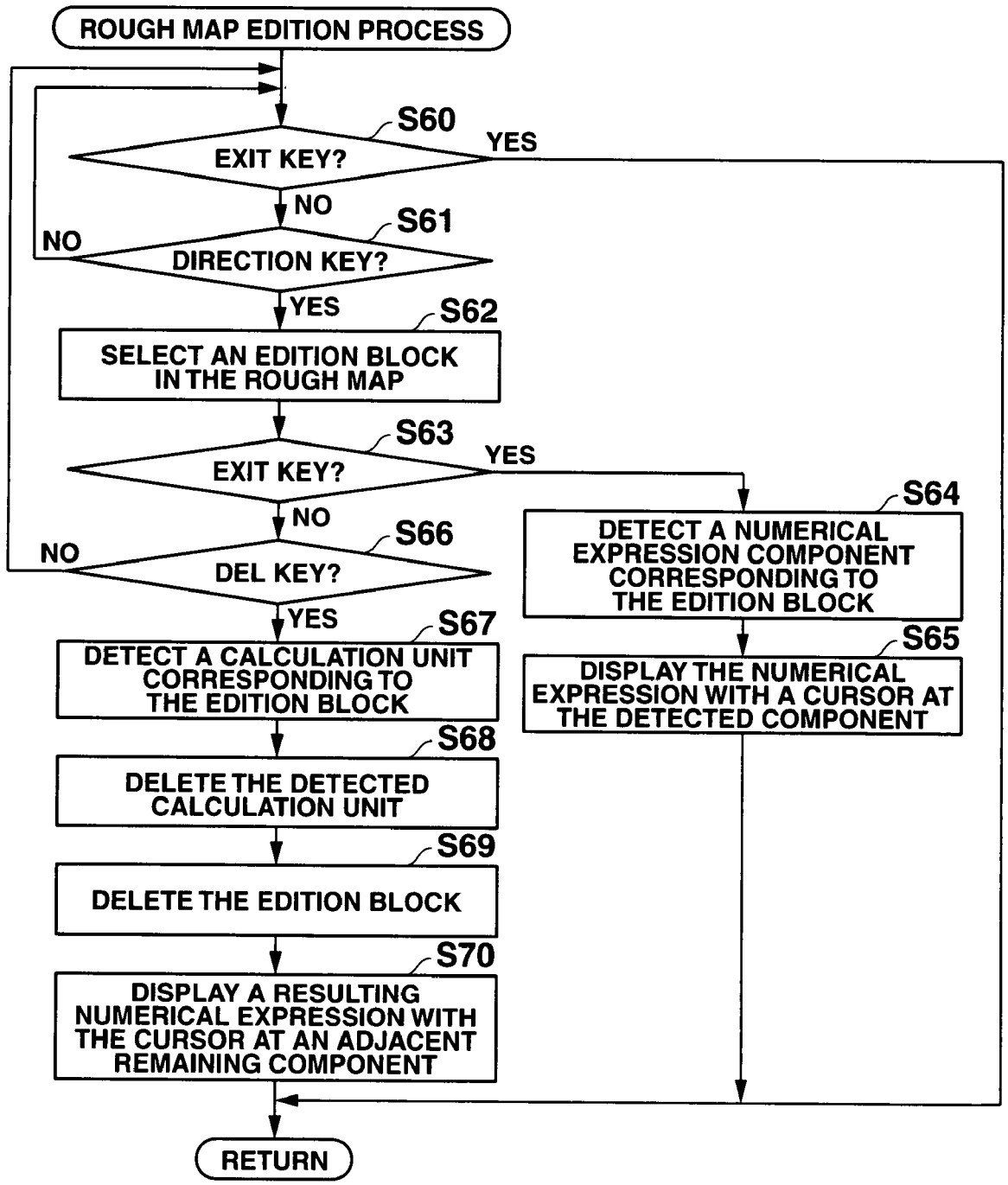
FIG. 5 is a flowchart indicative of a rough map edition process to be performed by the present invention.
Figure 8A:
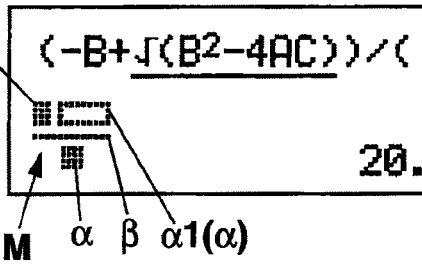
FIG. 8(a)-(e) illustrate a rough map edition process to be performed by the present invention.
Figure 8B:
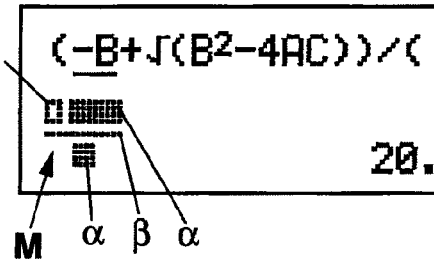
Figure 8C:
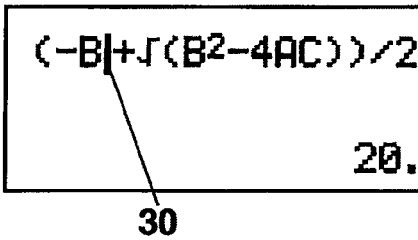
Figure 8D:
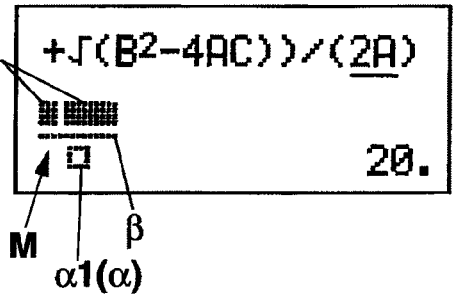
Figure 8E:
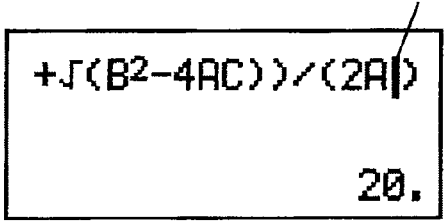

FIGS. 3-5 is a flowchart indicative of a numerical edition process in which the CPU 8 reads the numerical expression edition program 60 from the ROM 6 and executes the program.

When this process starts in FIG. 3, the CPU 8 displays a numerical expression in the single line expression form or a natural expression form on the display screen 3. The CPU 8 then determines whether the rough display key 27 has been depressed in a state in which the cursor 30 is displayed at the position of any component of the numerical expression (step S1). If not (NO in step S1), the CPU 8 goes to another process.

When determining that the rough display key 27 has been depressed in step S1, the CPU 8 performs a rough map display process that displays a rough map M (see FIG. 6(b)) of the numerical expression expressed in the natural expression form (step S2).

In a flowchart of FIG. 4 indicative of the details of step S2, the CPU 8 creates a virtual picture in the RAM 7, disposes the respective components of the numerical expression at proper positions on the virtual picture based on the information in the numerical expression data storage area 70, thereby displaying the numerical expression in the natural expression form on the virtual picture (step S40 in FIG. 4), irrespective of the size of the display area of the display screen 3.

Then, the CPU 8 divides the numerical expression data into calculation units in each of which the numerical expression data is calculated (step S41), and converts these calculation units to display blocks α of a small size (see FIG. 6(b)), thereby producing a rough map M indicative of the numerical expression, and then displays this map on the virtual picture (step S42).

Each calculation unit includes a numeral; a variable; a numerator and a denominator of a fraction; a numerical expression, an upper limit and a lower limit of integration; an expression, an upper limit, a variable and a lower limit involving a summing calculation; and/or a sinusoidal function. Note that each calculation unit is not required to be a minimum unit in which the calculation is performed. For example, the whole of a plurality of minimum calculation units bracketed off may be handled as a single calculation unit. In addition, the whole of numerical expression units each subjected to integration or summing calculation may be handled as a single calculation unit.

In this embodiment, the CPU 8 detects a calculation unit from the numerical expression based on character codes of the numerical expression data. When a numerical expression includes a fraction, the CPU 8 handles the numerator and denominator of the fraction as separate calculation units and displays a vinculum β (see FIG. 6(b)) in the rough map M. When there is an operator in the numerical expression which is not included in any calculation unit, the CPU 8 will not display the operator on the rough map M.

Then, the CPU 8 calculates a display size of the rough map M on the display screen 3 based on the display size of the map M on the virtual picture (step S43). The CPU 8 then determines whether the calculated display size falls within the display area of the display screen 3, or the whole map M can be displayed on the display screen 3 (step S44).

When determining in step S44 that the rough map M is not displayable, the CPU 8 performs error processing (step S45), terminates the rough map display process, and then goes to step S3 (see FIG. 3).

When determining in step S44 that the rough map M is displayable, the CPU 8 sets a rough map M display area for the numerical expression in the display area of the display screen 3 (step S46), and then displays both the numerical expression and the rough map M there (step S47).

More specifically, when the rough display key 27 is depressed in a state in which, for example, a numerical expression of FIG. 6(a) is displayed in the single expression form (YES in step S1), the CPU 8 displays the numerical expression and the rough map M in the left-hand area of FIG. 6(b) (step S47).

More specifically, when the rough display key 27 is depressed in a state in which, for example, a numerical expression of FIG. 7(a) is displayed in the single expression form (YES in step S1), the CPU 8 displays both the numerical expression and the rough map M, as shown in the left-hand area of FIG. 6(b) (step S47). Corresponding display pictures of a conventional mathematical calculator are shown in the right-hand areas of FIGS. 6(b) and 7(b).

Then, when the CPU 8 emphatically displays an edition block α1 of the calculation unit blocks α of the rough map M and corresponding to a numerical expression component indicated by the cursor 30 (step S48), deletes the cursor indication from the numerical expression, emphatically displays in the numerical expression the calculation unit corresponding to the edition block α1, and then terminates the rough map display process.

More specifically, when the cursor 30 is shown as a horizontal line segment under a calculation unit "$\sqrt{(B^2-4AC)}$" in a left-hand area of FIG. 6(*c*), a block indicative of the calculation unit "$\sqrt{(B^2-4AC)}$" is displayed emphatically as an outline edition block α1 in the rough map M at a lower left-hand position in FIG. 6(*c*) (step S48). The calculation unit "$\sqrt{(B^2-4AC)}$" is displayed underlined. A display picture of the prior art mathematical calculator corresponding to that shown in the left-hand area of FIG. 6(*c*) involving the present invention is displayed for reference in the right-hand area of FIG. 6(*c*).

Then, the CPU 8 performs a rough map edition process of FIG. 3 in which the CPU 8 edits a numerical expression, using the rough map M (step S3 in FIG. 3). In this process, the CPU 8 determines whether the EXIT key 28 has been depressed (step S60 in FIG. 5). If so, the CPU 8 terminates the rough map edition process and then the numerical expression edition process of FIG. 3.

When determining in step S60 that no EXIT key 28 has been depressed, the CPU 8 then determines whether any key of the direction key pad 24 has been depressed (step S61). If not, the CPU 8 goes to step S60. When determining that any key of the direction key unit 24 has been depressed, the CPU 8 selects a calculation unit as an edition block α1 in the rough map M in the direction specified by the direction key (step S62). The CPU 8 also causes the display screen 3 to display the numerical expression such that the calculation unit corresponding to the selected edition block α1 falls within the display area of the display screen 3, thereby displaying the calculation unit emphatically.

More specifically, when a "left" key of the direction key pad 24 is depressed in a state where the content of FIG. 8(*a*) is displayed (YES in step S61), a calculation block α present in the "left" direction is selected as an outline edition block α1 (step S62) and a calculation unit "−B" corresponding to the selected edition block α1 is displayed underlined emphatically.

Likewise, when a "down" key of the direction key pad 24 is depressed in the state in which the content of FIG. 8(*a*) is displayed, the CPU 8 selects an edition block α1 present in the specified "down" direction (step S62) and then displays the latter part of numerical expression such that a numerical expression part including a calculation unit "2A" corresponding to the selected edition block α1 falls within the display area with the calculation unit "2A" displayed underlined emphatically, as shown in FIG. 8(*e*).

Then, the CPU 8 determines whether the EXIT key 28 has been depressed (step S63 in FIG. 5). If so, the CPU 8 checks the rough map M with the numerical expression to detect a component of the numerical expression included in the selected edition block α1 (step S64), moves the cursor 30 to the position of the detected component, thereby displaying on the display screen 3 the numerical expression with the cursor 30 at that position (step S65). Then, the CPU 8 terminates the rough map edition and hence the numerical expression edition process in FIG. 3.

More specifically, when the EXIT key 28 is depressed in a state in which the content of FIG. 8(*b*) is displayed, (YES in step S63), the CPU 8 detects the numerical expression component "−B" included in the edition block α1 (step S64) and then displays the cursor 30 at the position of (herein, after) the component "B" (step S65). When the EXIT key 28 is depressed in a state in which the content of FIG. 8(*d*) is displayed (YES in step S63), the CPU 8 detects a numerical expression component "2A" included in the edition block α1 (step S64), and then displays the cursor 30 at the position of (herein, after) the component "2A" (step S65).

When determining in step S63 that the EXIT key 28 has not been depressed (NO in step S63 in FIG. 5), the CPU 8 determines whether the DEL key 23 has been depressed (step S66). If not, the CPU 8 goes to step S60.

When determining in step S66 that the DEL key 23 has been depressed, the CPU 8 checks the rough map M with the numerical expression, thereby detecting all the numerical expression components of the display block α1 to be deleted (step S67), deletes all of them from the numerical expression (step S68) and then the edition block α1 from the rough map M (step S69). When operators or bracket symbols which do not any longer involve the calculation are left before and/or after a deleted component, the CPU 8 deletes these symbols from the numerical expression.

Figures 9A, 9B:
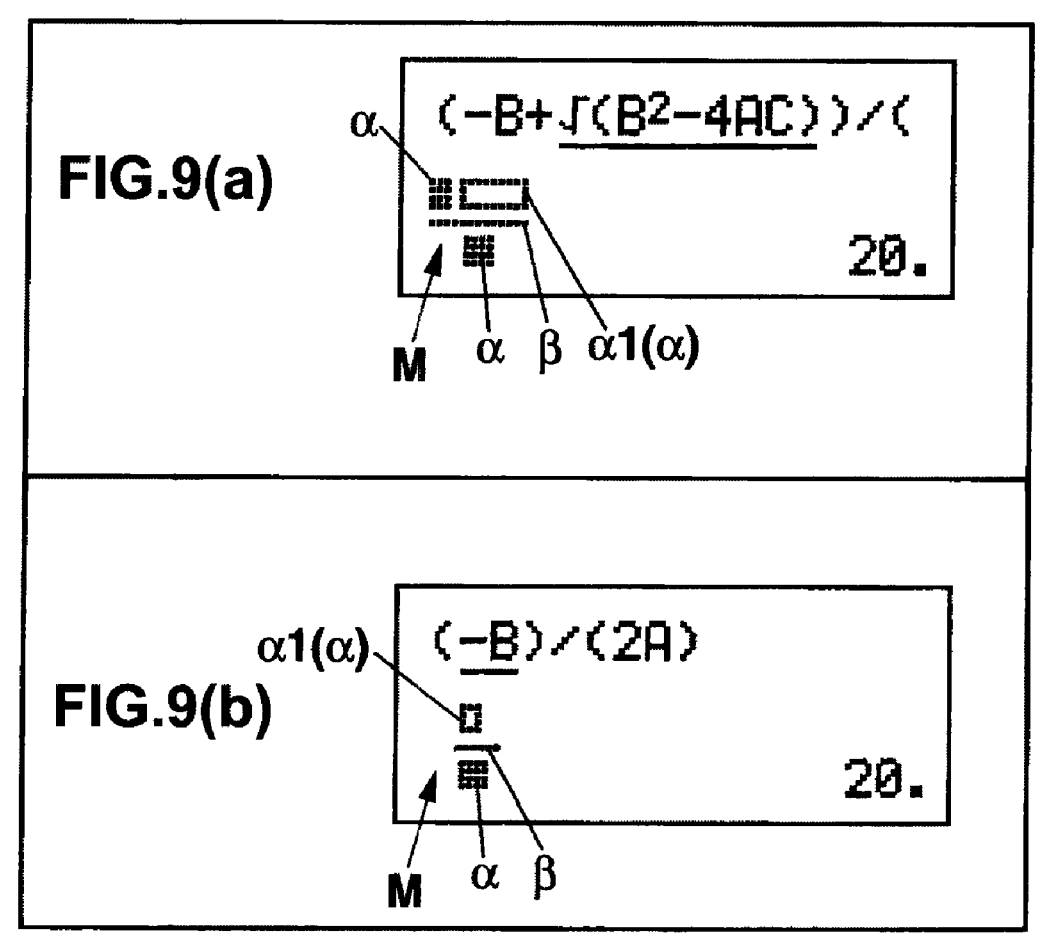

Then, CPU 8 moves the cursor 30 to the position of a remaining numerical expression component adjacent to the deleted unit, thereby displaying on the display screen 3 a resulting numerical expression along with the cursor 30 at that position (step S70), and then terminates the rough map edition process. More specifically, when the DEL key 23 is depressed in a state in which, for example, the content of FIG. 9(*a*) is displayed (YES in step S66), the CPU 8 deletes a calculation unit "$\sqrt{(B^2-4AC)}$" corresponding to the edition block α1 and an operator "+" present directly before the calculation unit, as shown in FIG. 9(*b*) (step S68). The CPU 8 also deletes the edition display block α1 from the rough map M (step S69). The CPU 8 displays the numerical expression along with the cursor 30 positioned in the numerical expression (step S70). Thus, the numerical expression edition process is terminated in FIG. 3.

According to the mathematical calculator 1, a rough map M of a numerical expression in the natural expression form is displayed as shown in FIGS. 6(*b*) and 7(*b*) in step S47 of FIG. 4. Thus, even if the structure of the numerical expression is complicated unlike a conventional case in which the numerical expression is displayed in the single line expression form, the user can easily grasp the structure of the numerical expression in the natural expression form. Since the size of the calculation unit display block α is smaller than the corresponding calculation unit, the whole rough map M is displayed and the user can grasp the whole structure of the numerical expression even when the numerical expression is massive unlike the conventional case in which the numerical expression is displayed in the natural expression form. In addition, since the rough map M is displayed in a state in which the numerical expression is displayed, the numerical expression and its rough map M can be compared. Thus, the user can easily grasp the whole structure of the numerical expression.

As shown in FIG. 6(*c*), an edition display block α1 corresponding to the edition unit of the numerical expression shown by the cursor 30 is displayed emphatically in the rough map M. Thus, the part of the numerical expression to be edited is easy to grasp, thereby facilitating the edition of the numerical expression.

As shown in FIG. 8, each time a different edition display block α1 is selected in step S62 of FIG. 5, the cursor is moved to the position of an edition unit of the numerical expression corresponding to the selected edition display block α1. Thus, selection of an edition component of the numerical expression is facilitated unlike a case where an edition component is selected individually among the numerical expression components. Thus, the numerical expression is easier to edit.

As shown in FIG. 9, when the DEL key 23 is depressed, all the numerical expression components corresponding to the edition display block α1 to be deleted are deleted from the numerical expression in step S68 of FIG. 5. Thus, deletion is simplified unlike the case where the respective components of the numerical expression are deleted individually. A component(s) of the numerical expression to be deleted by deleting an edition display block α1 of the rough map M is indicated clearly by the cursor 30 and hence the numerical expression is easier to edit unlike the case where the respective components of the numerical expression are deleted individually.

While in the embodiment the inventive numerical expression display control apparatus is illustrated as applied to the mathematical calculators, it is applicable to mobile telephones, personal computers, electronic timepieces, PDAs (Personal Digital Assistants). etc.

While in the embodiment the rough map display process (step S2) and the rough map edition process (step S3) are illustrated as performed in this order when the rough display key 27 is depressed (YES in step S1), only the rough map display process may be performed instead.

While in the embodiment the rough map M is illustrated as displayed in the lower left-hand area of the display screen 3, it may be displayed in the upper right-hand area of the display, as shown in FIGS. 10(b) and (c).

While in the embodiment only the edition display block α by deleting an edition display block α1 of the rough map M is illustrated as displayed emphatically in an outline frame, it may be emphatically displayed with an underline or by light flashing.

While only a calculation unit corresponding to an edition display block α1 is illustrated as displayed emphatically with an underline in the numerical expression, it may be displayed by light flashing instead.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-085535 filed on Mar. 27, 2006 and including specification, claims, drawings and summary. The disclosure of the above Japanese patent application is incorporated herein by reference in its entirety.

What is claimed is:

1. A numerical expression display control apparatus comprising:
   a display;
   an input unit that inputs a numerical expression to the apparatus;
   a dividing unit that divides the numerical expression inputted by the input unit into a plurality of calculation units; and
   a display controller that converts the plurality of calculation units to a like number of smaller display blocks, and forms and displays on the display a map in which the display blocks are disposed at positions corresponding to those of the plurality of calculation units in the numerical expression expressed in a natural expression form.

2. The numerical expression display control apparatus of claim 1, wherein the display controller comprises a numerical expression display controller that displays the inputted numerical expression on the display in one of a single line expression form and in the natural expression form by disposing components of the numerical expression at proper positions in a display area of the display.

3. The numerical expression display control apparatus of claim 2, wherein the display controller displays the map on the display in a state in which the numerical expression is displayed.

4. The numerical expression display control apparatus of claim 2, further comprising:
   an edition object specifying unit that specifies as an object to be edited at least one component of the numerical expression displayed by the numerical expression display controller, and wherein:
   the display controller emphatically displays in the map on the display a display block corresponding to the at least one component of the numerical expression to be edited in the numerical expression.

5. The numerical expression display control apparatus of claim 4, further comprising:
   an edition block selecting unit that selects an edition display block in the map in a direction specified manually, and wherein:
   each time the edition block selecting unit selects a different edition display block, the edition block specifying unit displays on the display an element of the plurality of calculation units of the numerical expression corresponding to the selected edition display block.

6. The numerical expression display control apparatus of claim 4, further comprising:
   an edition block deleting unit that deletes the edition display block manually from the map, and wherein:
   the numerical expression display controller deletes from the numerical expression all the numerical expression components corresponding to the edition display block to be deleted by the edition block deleting unit, and then displays a resulting numerical expression.

7. A numerical expression display control method comprising:
   inputting a numerical expression to a display;
   dividing the inputted numerical expression into a plurality of calculation units; and
   converting the plurality of calculation units to a like number of smaller display blocks, and forming and displaying on the display a map in which the display blocks are disposed at positions corresponding to those of the plurality of calculation units in the numerical expression expressed in a natural expression form.

8. A software program product embodied in a computer readable medium for performing the method of claim 7.

* * * * *